(12) United States Patent
Schwindt et al.

(10) Patent No.: US 10,957,330 B2
(45) Date of Patent: Mar. 23, 2021

(54) SYSTEMS AND METHODS FOR SECURE COMMANDS IN VEHICLES

(71) Applicant: GE Aviation Systems Limited, Cheltenham (GB)

(72) Inventors: Stefan Alexander Schwindt, Cheltenham (GB); Barry Foye, Cheltenham (GB)

(73) Assignee: GE Aviation Systems Limited, Cheltenham (GB)

(*) Notice: Subject to any disclaimer, the term of this patent is extended or adjusted under 35 U.S.C. 154(b) by 108 days.

(21) Appl. No.: 16/428,597

(22) Filed: May 31, 2019

(65) Prior Publication Data
US 2019/0371341 A1 Dec. 5, 2019

(30) Foreign Application Priority Data
Jun. 1, 2018 (EP) .................................... 18175563

(51) Int. Cl.
*G10L 17/22* (2013.01)
*G10L 17/04* (2013.01)
*G10L 17/06* (2013.01)
*G10L 17/00* (2013.01)

(52) U.S. Cl.
CPC ............. *G10L 17/22* (2013.01); *G10L 17/00* (2013.01); *G10L 17/04* (2013.01); *G10L 17/06* (2013.01)

(58) Field of Classification Search
CPC ......... G10L 17/04; G10L 17/06; G10L 17/22; G06F 21/32
See application file for complete search history.

(56) References Cited

U.S. PATENT DOCUMENTS

| | | | |
|---|---|---|---|
| 6,882,288 B2 | 4/2005 | Weigl | |
| 7,024,023 B2 | 4/2006 | Arnouse | |
| 7,415,326 B2 | 8/2008 | Komer et al. | |
| 7,783,081 B2 | 8/2010 | Roques et al. | |
| 8,370,157 B2 | 2/2013 | Boregowda et al. | |
| 9,550,578 B2 | 1/2017 | McCullough et al. | |
| 9,824,689 B1 | 11/2017 | Shapiro | |
| 2003/0068044 A1 | 4/2003 | Nikolsky | |
| 2003/0191639 A1* | 10/2003 | Mazza | G10L 15/183 704/231 |

(Continued)

FOREIGN PATENT DOCUMENTS

WO    03/029048 A2    4/2003

*Primary Examiner* — Huyen X Vo
(74) *Attorney, Agent, or Firm* — Wood IP LLC

(57) ABSTRACT

Systems and methods for control of vehicles are provided. A computer-implemented method in example embodiments may include receiving, at a computing system comprising one or more processors positioned in a vehicle, voice data from one or more audio sensors positioned in the vehicle. The system can determine whether configuration of a reference voiceprint for a speech processing system of the vehicle is authorized based at least in part on performance data associated with the vehicle. In response to determining that configuration of the reference voiceprint is authorized, a first reference voiceprint based on the reference voice data can be stored and the speech processing system configured to authenticate input voice data for a first set of voice commands based on the reference voiceprint.

19 Claims, 11 Drawing Sheets

(56) References Cited

U.S. PATENT DOCUMENTS

2014/0309804 A1* 10/2014 Ricci ...................... G01C 21/26
                                                                                    701/1
2017/0053645 A1* 2/2017 Pierfelice ................ G10L 15/07
2018/0350167 A1* 12/2018 Ekkizogloy .......... G08G 1/0968

* cited by examiner

SYSTEMS AND METHODS FOR SECURE COMMANDS IN VEHICLES

FIELD

The present disclosure relates generally to vehicles, and more particularly to control systems for vehicles.

BACKGROUND

A vehicle, such as an aerial vehicle, can rely on one or more thrust devices such as jet turbine engines, turbofan engines, and turbojet engines for propulsion of the vehicle and control of movement, as well as one or more control surfaces for controlling propulsion and movement of the vehicle. Control surfaces include elevators, rudders, ailerons, spoilers, flaps, slats, air brakes, or trim devices, etc. Various actuators, servo motors, and other devices may be used to manipulate control surfaces and thrust devices. In addition to the systems for propulsion and motion control, aerial vehicles often include many mission-related systems, such as communication systems, navigation systems including inertial and satellite navigation systems, flight management systems, and various avionics systems. Typically, vehicles include multiple control systems to allow operators such as pilots, crew members, and other authorized personnel to interface with the various vehicle systems. Numerous user interfaces are often provided to allow authorized personnel to operate the various vehicle systems.

BRIEF DESCRIPTION

Aspects and advantages of the disclosed technology will be set forth in part in the following description, or may be obvious from the description, or may be learned through practice of the disclosure.

According to example aspects of the present disclosure, there is provided a computer-implemented method that comprises: receiving, at a computing system comprising one or more processors positioned in a vehicle, voice data from one or more audio sensors positioned in the vehicle; determining, by the computing system, whether configuration of a reference voiceprint for a speech processing system of the vehicle is authorized based at least in part on performance data associated with the vehicle; in response to determining that configuration of the reference voiceprint is authorized, storing, by the computing system, a first reference voiceprint based on the voice data; and configuring, by the computing system, the speech processing system to authenticate voice data for a first set of voice commands based on the first reference voiceprint.

According to other example aspects of the present disclosure, there is provided a system that comprises one or more sensors positioned in a vehicle and configured to generate voice data, and one or more processors. The one or more processors are configured to: receive voice data from the one or more audio sensors positioned in the vehicle; determine whether configuration of a reference voiceprint for a speech processing system of the vehicle is authorized based at least in part on performance data associated with the vehicle; in response to determining that configuration of the reference voiceprint is authorized, store a first reference voiceprint based on the voice data; and configure the speech processing system to authenticate voice data for a first set of voice commands based on the reference voiceprint.

According to yet other example aspects of the present disclosure, there is provided a non-transitory computer-readable medium storing computer instructions, that when executed by one or more processors, cause the one or more processors to perform operations. The operations include: receiving, from one or more sensors of a vehicle, first voice data including a locally-generated voice command; comparing the locally-generated voice command with a first set of authorized commands; comparing the first voice data with one or more reference voiceprints; authorizing the locally-generated voice command for execution based at least in part on the first voice data corresponding to at least one of the one or more reference voiceprints and the locally-generated voice command corresponding to the first set of authorized commands; receiving, with a wireless interface of the vehicle, second voice data including a remotely-generated voice command; comparing the remotely-generated voice command with a second set of authorized commands; and authorizing the remotely-generated voice command based at least in part on the remotely-generated voice command corresponding to the second set of authorized commands.

According to yet other example aspects of the present disclosure, there is provided a computer-implemented method that includes: receiving, at a computing system comprising one or more processors positioned in a vehicle, sensor data from one or more sensors positioned in the vehicle; determining, at the computing system, whether configuration of a reference biometric for a control processing system of the vehicle is authorized based at least in part on performance data associated with the vehicle; in response to determining that configuration of the reference biometric is authorized, storing a first reference biometric based on the reference biometric data; and configuring the control processing system to authenticate input for a first set of control commands based on the reference biometric.

These and other features, aspects and advantages of the disclosed technology will become better understood with reference to the following description and appended claims. The accompanying drawings, which are incorporated in and constitute a part of this specification, illustrate embodiments of the disclosed technology and, together with the description, serve to explain the principles of the disclosed technology.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
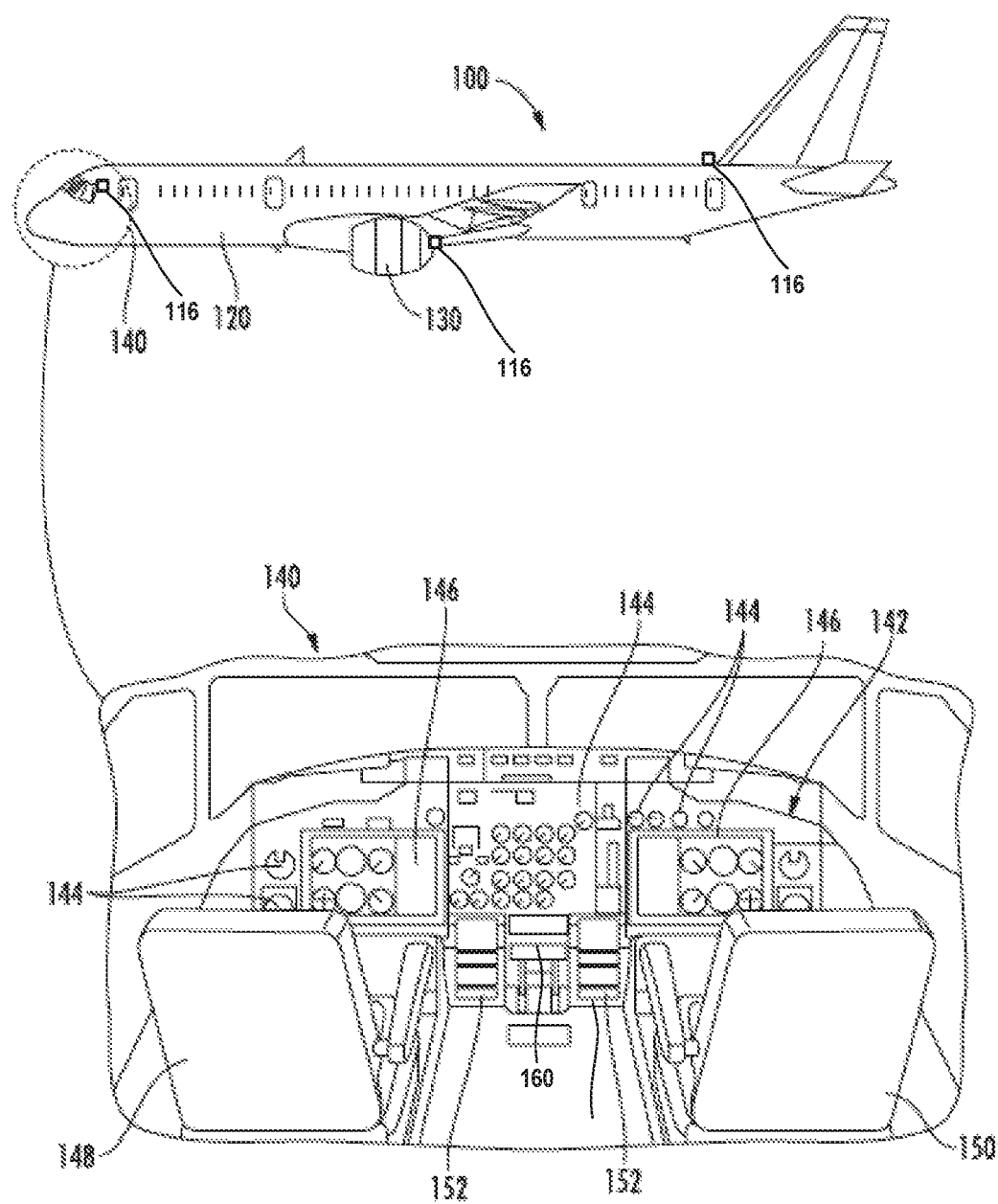
FIG. 1 is a block diagram depicting an example of an aerial vehicle and cockpit in which embodiments of the present disclosure may be practiced.

Reference now will be made in detail to embodiments of the disclosure, one or more examples of which are illustrated in the drawings. Each example is provided by way of explanation, not limitation of the disclosed embodiments. In fact, it will be apparent to those skilled in the art that various modifications and variations can be made in the present disclosure without departing from the scope or spirit of the claims. For instance, features illustrated or described as part of example embodiments can be used with another embodiment to yield a still further embodiment. Thus, it is intended that the present disclosure covers such modifications and variations as come within the scope of the appended claims and their equivalents.

As used in the specification and the appended claims, the singular forms "a," "an," and "the" include plural referents unless the context clearly dictates otherwise. The use of the term "about" in conjunction with a numerical value refers to within 25% of the stated amount.

Example aspects of the present disclosure are directed to systems and methods for providing user interfaces for controlling vehicles, and more particularly, to systems and methods for voice or speech-enabled control systems for vehicles such as aerial vehicles. In accordance with example embodiments, a speech processing system is provided for a vehicle that enables pilots or other operators to safely and securely provide voice commands for controlling various vehicle systems. The speech processing system is operable in multiuser environments, such as in commercial airline applications where numerous pilots and crew members may operate a fleet of aerial vehicles. A multiuser environment may be addressed by securely authenticating users using temporary reference voiceprints, which are generated in real-time and authorized for limited time periods. The temporary reference voiceprints can be generated in response to authorization of reference voiceprint configuration to provide secure operation of the speech processing system. In example embodiments, authorization of reference voiceprint configuration can be based at least in part on vehicle performance data. The utilization of temporary voiceprints enables authentication without long-term storage of user biometric information in some examples.

Traditional voice command systems for aerial vehicle controls often rely on complex biometric databases or other like techniques in order to authenticate users for the system. For example, traditional systems may store a database of fingerprints for authorized users of the system. When a crewmember attempts to use the system, the crewmember provides input biometric information which is then compared with the database. These databases may be stored aboard an aerial vehicle, requiring large amounts of local storage, or may be stored remotely and accessed during the authentication process. Such systems may pose privacy concerns in some cases. Additionally, such systems may be difficult to implement where the number of users is high and ever-changing.

According to example embodiments of the disclosed technology, a speech processing system is provided that enables safe and secure voice commands for controlling an aerial vehicle. In some examples, the system enables authentication of the source of input voice commands to limit the ability to use voice commands to preauthorized personnel. Moreover, authentication is provided for environments where the pilot or other crew members are often changing, such as in commercial airline applications. Additionally, authentication can be provided in some examples without requiring long-term storage of user biometric information. In this manner, the system may address laws or regulations of particular regions that limit the ability to store an individual's biometric information. Moreover, the system is adaptable to changing users by generating temporary reference voiceprints in real time, and then authorizing these voiceprints for limited time periods thereafter.

In some implementations, the system receives audio data from one or more audio sensors positioned in an aerial vehicle, such as in the cockpit of an aerial vehicle. The system can determine whether configuration of a reference voiceprint for a speech processing system of the aerial vehicle is authorized. The determination can be made based at least in part on performance data associated with the aerial vehicle. The performance data can be based on sensor data received from one or more sensors of the aerial vehicle in various embodiments. For example, the performance data can indicate a position, speed, altitude, or the status of external connections to the aerial vehicle. The system can analyze the performance data to determine whether the vehicle is in a safe or secure operational state. If the system determines that configuration of a reference voiceprint is authorized, a reference voiceprint can be generated and stored based on the audio data. The system can then configure the speech processing system to authenticate additional voice data associated with one or more sets of voice commands based on the reference voiceprint. The one or more sets of voice commands can be associated with controlling the aerial vehicle.

After storing the reference voiceprint and configuring the speech processing system, the system can receive additional voice data for controlling the aerial vehicle. The system can selectively authorize execution of one or more of the voice commands based on comparing the additional voice data with the reference voiceprint. The reference voiceprint can be authorized for authenticating voice data for a limited or predetermined amount of time. For example, the reference voiceprint may be generated prior to or at the beginning of a flight. The system can authorize the reference voiceprint for voice authentication during the associated flight, and disable authentication of voice data based on the reference voiceprint during a subsequent flight. This can be done without predetermined or stored user biometric information.

However, in other examples additional authentication can be provided using such biometric information to provide additional security.

Using the described techniques, the system can enable a pilot or other user to configure a reference voiceprint when the system determines that the vehicle is in a secure operational state. For instance, during a rollout phase of the flight from the gate to a runway, the system may determine that the vehicle is in a secure operational state. The system may determine that the aerial vehicle is in a secure operational state during additional flight phases as well. As such, audio received in the cockpit from a pilot or other crew member can be used to generate a reference voiceprint while the aerial vehicle is in a known secure state. The first voice data can be associated with air traffic control communication from the aerial vehicle during the rollout phase. This reference voiceprint can be authorized to authenticate input voice data during the associated flight. At the conclusion of the flight, the reference voiceprint can be discarded such as being deleted from the system. In this manner, laws or other regulations prohibiting or limiting the storage of biometric information may be satisfied. Nevertheless, a reference voiceprint for authentication during the flight can be generated in a safe and secure manner. Accordingly, the reference voiceprint can be used during the flight to prohibit unauthorized users from causing vehicle operations using voice commands. At the same time, it is not required that the pilot or other crew member provide biometric information for long-term storage.

In some examples, the speech processing system utilizes multiple sets of authorized voice commands Individual sets of authorized voice command can be associated with different users, groups of users, devices, or sources (e.g., interfaces) from which the voice data is received. This permits different personnel to have access to different voice commands, as well as provides for the unique ability for remote voice commands to be used. For example, the speech processing system can be configured to detect voice commands over a wireless communication interface with an air traffic control system in some examples. Certain commands such as those to change an operating frequency of the communication system of the aerial vehicle may be authorized for control over a remote audio link. On the other hand, other voice commands may not be authorized for remote use.

Voice commands including authorization by a speech processing system in accordance with embodiments of the disclosed technology may provide unique capabilities for controlling various security systems of the aerial vehicle. For example, many aerial vehicles include a cockpit door which can be locked from the cockpit side to prevent unauthorized entry from other parts of the aerial vehicle. In accordance with embodiments of the disclosed technology, voice commands may be used to lock and/or unlock a cockpit door in a secure manner. For example, a voice command may be received from outside of the cockpit to unlock the cockpit door. The voice data may be compared with a temporary reference voiceprint. If the voice data matches a temporary reference voiceprint, the door may be unlocked. Additional security measures such as the detection of stress in voice data as well as an ability to override an input internal to the cockpit can be provided in various embodiments.

Embodiments of the disclosed technology provide a number of technical benefits and advantages, particularly in the area of aerial vehicles. As one example, the techniques described herein enable the control of an aerial vehicle using voice commands in a safe and secure manner More particularly, aerial vehicle performance data can be used to authorize the generation of temporary reference voiceprints. Such a technique for voice command using an aerial vehicle may overcome shortcomings of traditional techniques that rely on permanent biometric data storage and access. Moreover, such a technique may address the unique requirements of fleets of aerial vehicles operated by multiple users. Aircraft performance data may be used to authorize generation of a temporary reference voiceprint to enable pilot or other crew member control of the aerial vehicle in a secure manner.

Embodiments of the disclosed technology additionally provide a number of technical benefits and advantages in the area of computing technology. For example, the disclosed system can obtain performance data to generate temporary reference voiceprints. Such a technique may avoid the high resource requirements of permanent biometric data storage. Additionally, such techniques may provide more efficient processing by a computing system to authenticate speech. The more efficient processing may be used to both configure a speech processing system and thereafter operate the speech processing system to authorize voice commands for controlling an aerial vehicle.

FIG. 1 depicts an aerial vehicle 100 according to example embodiments of the present disclosure. As shown, aerial vehicle 100 can include a fuselage 120, one or more engine(s) 130, and a cockpit 140. Engines 130 can be used for propulsion of and/or on-board power generation for the aerial vehicle 100. An engine 130 can be a gas turbine engine such as a jet turbine engine, turboprop engine, turbofan engine, a turbo shaft engine, or any other suitable engine, including piston engine propellers, electrically-driven fans or propellers, or any hybrid of the above. Although the aerial vehicle 100 is depicted as a fixed-wing aircraft, in other example embodiments the aerial vehicle may be a rotary-wing aircraft, a smaller fixed-wing aircraft, a land-air hybrid aircraft, an unmanned aerial vehicle, or some other type of aerial vehicle. Moreover, the subject matter of the present disclosure may apply to other types of vehicles, including but not limited to land-based vehicles such as passenger cars, cargo trucks, and equipment, amphibious vehicles such as combination land and water craft, water vehicles such as boats and submarines, space vehicles such as satellites and rockets, other vehicles, or some combination thereof, etc. In example embodiments, the cockpit 140 can include a flight deck 142 having various instruments 144 and flight displays 146. It will be appreciated that instruments 144 can include, without limitation, a dial, gauge, or any other suitable analog device.

The aerial vehicle 100 can additionally include one or more sensors 116. The one or more sensors 116 can be used to detect one or more parameters related to the engine(s) 130, aerial vehicle 100, and/or atmosphere external and/or internal to the aerial vehicle. The one or more sensors 116 can communicate the one or more detected parameters to various systems such as a flight management system (FMS) and/or vehicle control system (VCS). In some implementations, the one or more sensors can communicate parameters to one or more external components.

A first user (e.g., a pilot) may be present in a seat 148 and a second user (e.g., a co-pilot) can be present in a seat 150. The flight deck 142 can be located in front of the pilot and co-pilot and may provide the flight crew (e.g., pilot and co-pilot) with information to aid in operating the aerial vehicle 100. The flight displays 146 can include primary flight displays (PFDs), multi-purpose control display units (MCDUs), navigation display (ND), or any suitable combination. During operation of the aerial vehicle 100, both the instruments 144 and flight displays 146 can display a wide range of vehicle, flight, navigation, and other information used in the operation and control of the aerial vehicle 100.

The instruments 144 and flight displays 146 may be laid out in any manner including having fewer or more instruments or displays. Further, the flight displays 146 need not be coplanar and need not be the same size. A touch screen display or touch screen surface (not shown) may be included in the flight displays 146 and may be used by one or more flight crew members, including the pilot and co-pilot, to interact with the aerial vehicle 100. The touch screen surface may take any suitable form including that of a liquid crystal display (LCD) and may use various physical or electrical attributes to sense inputs from the flight crew. It is contemplated that the flight displays 146 can be dynamic and that one or more cursor control devices (not shown) and/or one or more multifunction keyboards 152 can be included in the cockpit 140 and may be used by one or more flight crew members to interact with systems of the aerial vehicle 100. In this manner, the flight deck 142 may be considered a user interface between the flight crew and the aerial vehicle 100.

Additionally, the cockpit 140 can include an operator manipulated input device 160 that allows members of the flight crew to control operation of the aerial vehicle 100. In one example embodiment, the operator manipulated input device 160 can be used to control the engine power of the one or more engines 130. More specifically, the operator manipulated input device 160 can include a lever having a handle, and the lever can be movable between a first position and a second position. As such, a flight crew member can move the lever between the first and second positions to control the engine power of the one or more engine(s) 130. It will be appreciated that the pilot can move the lever to one of a plurality of intermediate third positions disposed between the first position and the second position.

In some examples, particularly with respect to helicopters, a pilot may sit on the right and a co-pilot on the left, whereas in fixed wing aircraft the pilot often sits on the left. In some cases, such as some official or application-specific aircraft, the aircraft may have multiple pilots and/or navigators in line with one another, such as a pilot in front and co-pilot/navigator in back. For some helicopters, a pilot may be positioned in the back and an operations member positioned in front or vice versa.

The numbers, locations, and/or orientations of the components of example aerial vehicle 100 are for purposes of illustration and discussion and are not intended to be limiting. As such, those of ordinary skill in the art, using the disclosures provided herein, will understand that the numbers, locations, and/or orientations of the components of the aerial vehicle 100 can be adjusted without deviating from the scope of the present disclosure.

Figure 2:
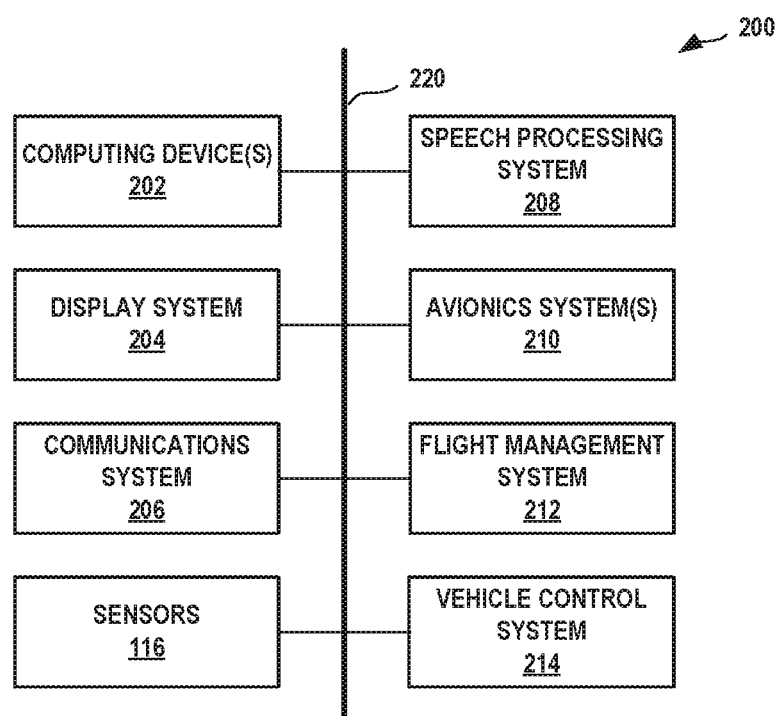
FIG. 2 is a block diagram depicting an onboard computing system of an aerial vehicle according to example embodiments of the present disclosure.

Referring now to FIG. 2, aerial vehicle 100 can include an onboard computing system 200 including one or more communication networks 220 including for example, one or more data buses and/or combinations of wired and/or wireless communication links. Communication networks 220 couple one or more onboard computing devices 202 to a variety of systems on the aerial vehicle 100. In FIG. 2, for example, onboard computing system 200 includes one or more onboard computing devices 202, a display system 204, a communications system 206, a speech processing system 208, an avionics system 210, a flight management system 212, a vehicle control system 214, and sensors 116. In example embodiments, the onboard computing devices 202 may include or implement any one or combination of the systems depicted in FIG. 2. The aerial vehicle can include a datalink protocol for communicating over satellite, very high frequency (VHF) radio, and/or high frequency (HF) radio, such as an aircraft communications addressing and reporting system (ACARS).

Display system 204 may include the flight displays 146 depicted in FIG. 1 of the aerial vehicle 100. More specifically, the display system 204 can include one or more display device(s) configured to display or otherwise provide information generated or received by the onboard computing system 200. In example embodiments, information generated or received by the onboard computing system 200 can be displayed on the one or more display device(s) for viewing by flight crew members of the aerial vehicle 100. The display system 204 can include a primary flight display, a multipurpose control display unit, or other suitable flight displays 146 commonly included within the cockpit 140 (FIG. 1) of the aerial vehicle 100.

The flight management system 212 may include a flight control system and navigation system in some implementations. In other implementations, the flight control system and navigation system may be separate from the flight management system 212. In example embodiments, the flight control system can control or automate the tasks of piloting and the flight management system can control or automate the tasks of navigation and guidance according to the flight plan of the aerial vehicle 100. The flight control system can include or be associated with, any suitable number of individual microprocessors, power supplies, storage devices, interface cards, auto flight systems, flight management computers, and other standard components. The flight control system can include or cooperate with any number of software programs (e.g., flight management programs) or instructions designed to carry out the various methods, process tasks, calculations, and control/display functions necessary for operation of the aerial vehicle 100. The flight control system may be separate from the onboard computing device(s) 202, or can be included with or implemented by the onboard computing device(s).

The aerial vehicle control system(s) 214 can be configured to perform various aerial vehicle operations and control various settings and parameters associated with the aerial vehicle 100. For instance, the aerial vehicle control system(s) 214 can be associated with the one or more engine(s) 130 and/or other components of the aerial vehicle 100. The aerial vehicle control system(s) 214 can include, for instance, digital control systems, throttle systems, inertial reference systems, flight instrument systems, engine control systems, auxiliary power systems, fuel monitoring systems, engine vibration monitoring systems, communications systems, flap control systems, flight data acquisition systems, a flight management system, a landing system, and other systems.

In some implementations, the vehicle control system 214 includes one or more engine controllers. For example, vehicle control system 214 may include an electronic engine controller (EEC) for each engine 130 in some embodiments. In other examples, vehicle control system 214 may include a Full Authority Digital Engine Control (FADEC) system. A FADEC system is often used for aerial vehicles having two or more engines because the FADEC system dynamically controls the operation of each gas turbine engine and requires minimal, if any, supervision from the pilot. The vehicle control system may include other control systems such as a fuel control system including one or more fuel controllers configured to control fuel flow for the one or more engines 130.

Avionics system 210 represents one or more electronic systems of the aerial vehicle configured to perform one or more individual aerial vehicle functions. Examples of avionics systems include communication systems, navigation systems, weather systems, radar systems, air traffic systems, ground proximity warning systems, etc. In some implementations, the avionics system can include or be in communication with a location system, for example. The location system can include a global positioning system (GPS), inertial reference systems, and the like.

The various systems of FIG. 2 may determine aircraft performance data from the sensor data received from the one or more sensors 116. In some implementations, the sensor data includes one or more parameters related to the engines 130, aerial vehicle 100, and/or atmosphere external to the aerial vehicle. In some examples, one or more sensors 116 can communicate one or more detected parameters to the various systems. The vehicle parameters may be included directly within the sensor data or may be derived from the sensor data. By way of example, vehicle parameters may include location (e.g., GPS coordinates), speed, vehicle attitude and/or orientation, rate of climb and/or descent, heading direction, various pressures, temperatures, fuel flow rate, and/or any other information pertaining to the aerial vehicle's current operating condition. The performance data may be stored locally using any suitable storage technology as described. In some examples, the performance data is derived from the aircraft sensor data. For example, multiple location coordinates may be analyzed in order to determine a projected trajectory of the aerial vehicle. In other examples, the performance data may include the aircraft sensor data directly. For example, one or more of the aircraft sensors may directly provide a measure of aerial vehicle speed.

In accordance with embodiments of the disclosed technology, the onboard computing system 200 includes a speech processing system 208. Speech processing system 208 is configured to provide a user interface between crew members or other authorized personnel associated with the aerial vehicle and the various aerial vehicle systems. In some examples, speech processing system 208 can initiate or otherwise cause system responses based on voice commands detected in audio detected by one or more sensors 116. For example, speech processing system 208 may respond to a detected voice command by issuing a control signal to one or more other systems of onboard computing system 200. Speech processing system 208 can identify a voice command and in response, issue the appropriate control signal to the appropriate component of onboard computing system 200. In this manner, speech processing system 208 provides a voice-enabled interface between crew members including pilots and one or more of the systems of the aerial vehicle.

Speech processing system 208 additionally provides security functions to inhibit unauthorized use of voice commands aboard the aerial vehicle. The security functions can be provided without requiring long-term storage of user biometric information. However, some implementations may utilize additional biometric information to provide additional security functions. Speech processing system 208 can enable the generation and use of temporary reference voiceprints to limit system responses to voice commands from authorized users. In some examples, speech processing system 208 determines whether configuration of reference voiceprints for the speech processing system is authorized. This determination can be based at least in part on performance data associated with the aerial vehicle in some embodiments. Speech processing system 208 can be configured to limit reference voiceprint configuration to times when the aerial vehicle is in a secure operational state. In this manner, the system can inhibit unauthorized users from generating reference voiceprints.

To provide enhanced security, speech processing system 208 can be configured to determine whether a plurality of inputs have been received confirming a secure operational state of the aerial vehicle prior to generating a reference voiceprint. Inputs identifying a secure operational state may include inputs identifying a phase of an aerial vehicle flight, inputs identifying a sensor associated with the voice data, inputs identifying a localization of the voice data, inputs identifying whether additional biometric information was authenticated, and/or other inputs identifying a condition of the aerial vehicle or environment related to the aerial vehicle.

The onboard computing system 200, including onboard computing devices 202 and the various other systems depicted in FIG. 2, may generally include one or more processor(s) and associated memory configured to perform a variety of computer-implemented functions, such as various methods, steps, calculations and the like disclosed herein. In some examples, control systems such as an engine control system and/or fuel control system may be programmable logic devices, such as a Field Programmable Gate Array (FPGA), however they may be implemented using any suitable hardware and/or software.

The term processor may generally refer to integrated circuits, and may also refer to a controller, microcontroller, a microcomputer, a programmable logic controller (PLC), an application specific integrated circuit (ASIC), a Field Programmable Gate Array (FPGA), and other programmable circuits. Additionally, the memory described herein may generally include memory element(s) including, but not limited to, computer readable medium (e.g., random access memory (RAM)), computer readable non-volatile medium (e.g., flash memory), a compact disc-read only memory (CD-ROM), a magneto-optical disk (MOD), a digital versatile disc (DVD) and/or other suitable memory elements or combinations thereof.

Any one or a combination of the systems of onboard computing system 200 may also include a communications interface. The communications interface can include associated electronic circuitry that is used to send and receive data. More specifically, the communications interface can be used to send and receive data between any of the various control systems. Similarly, a communications interface at any one of the controllers may be used to communicate with outside components such as another aerial vehicle and/or ground control. A communications interface may be any combination of suitable wired or wireless communications interfaces.

The different systems depicted in FIG. 2 of onboard computing system 200 may be implemented as hardware, software, or as a combination of hardware and software. The software may be stored as processor readable code and implemented in a processor, as processor readable code for programming a processor for example. In some implementations, one or more of the components can be implemented individually or in combination with one or more other components as a packaged functional hardware unit (e.g., one or more electrical circuits) designed for use with other units, a portion of program code (e.g., software or firmware) executable by a processor that usually performs a particular function of related functions, or a self-contained hardware or software component that interfaces with a larger system, for example. Each unit, for example, may include an application specific integrated circuit (ASIC), a Field Programmable Gate Array (FPGA), a circuit, a digital logic circuit, an analog circuit, a combination of discrete circuits, gates, or any other type of hardware or combination thereof. Alternatively or in addition, these components may include software stored in a processor readable device (e.g., memory) to program a processor to perform the functions described herein. The architecture depicted in FIG. 2 is one example implementation. These various computing-based elements may be configured at a single computing device, or may be distributed across multiple computing devices.

Figure 3:
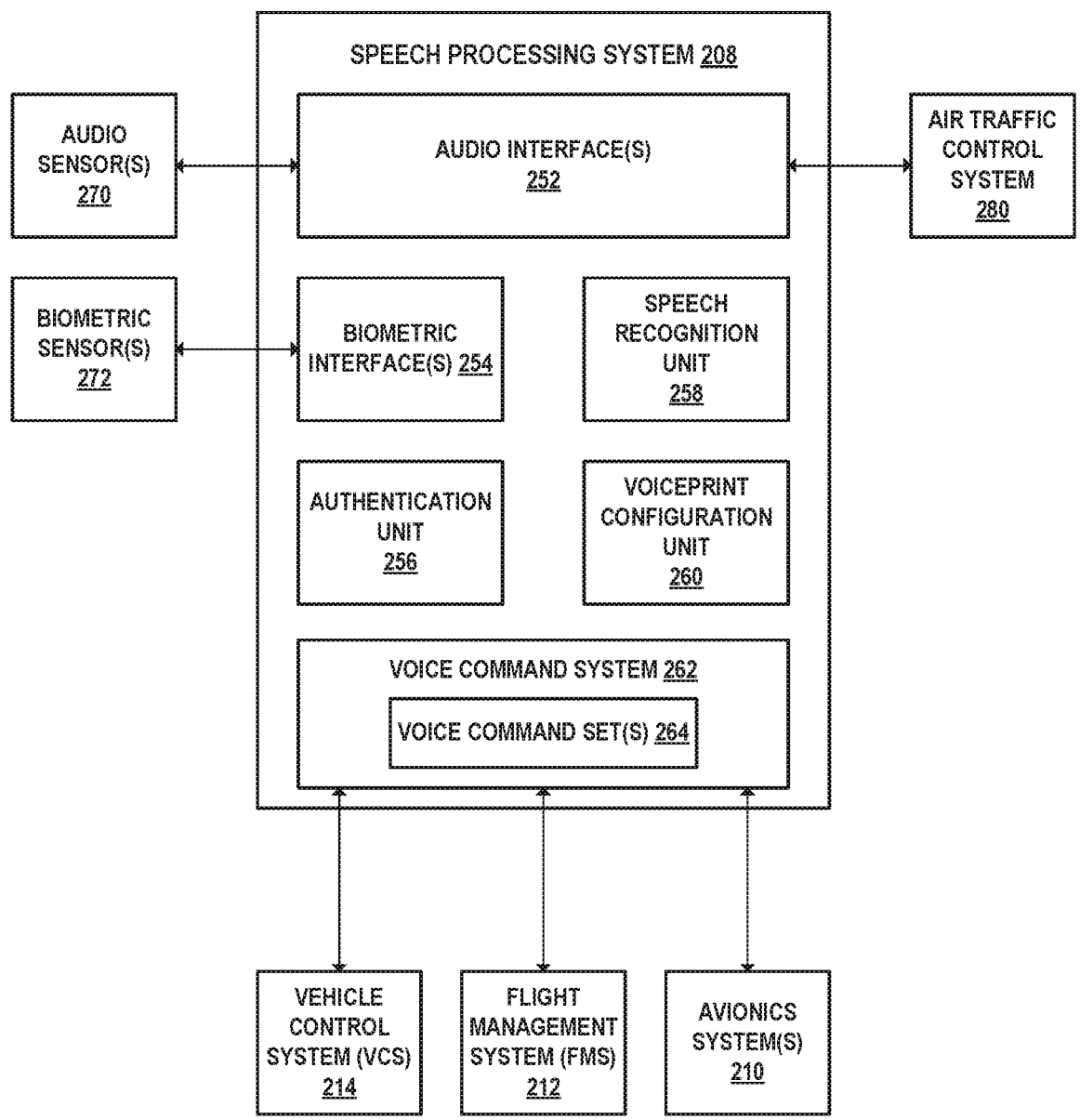
FIG. 3 is a block diagram depicting a speech processing system according to example embodiments of the present disclosure.

FIG. 3 is a block diagram depicting additional details of a speech processing system 208 in accordance with example embodiments of the disclosed technology. Speech processing system 208 includes one or more audio interfaces configured to receive and transmit analog and/or digital communication signals from one or more sources. In this example, audio interfaces 252 are in communication with one or more audio sensors 270 aboard the aerial vehicle 100. Audio sensors 270 are one example of sensors 116 (FIG. 2). Audio sensors 270 may include microphones or other audio input devices within the cockpit or other location of the aerial vehicle. Audio interface 252 is additionally in communication with an air traffic control system 280. Audio interface 252 may include a wireless interface. Audio interface 252 can include a datalink protocol for communicating over satellite, very high frequency (VHF) radio, and/or high frequency (HF) radio, such as an aircraft communications addressing and reporting system (ACARS). The aerial vehicle can include one or more transmitters configured to send and receive air traffic control commands. The transmitters can be configured to transmit messages over a plurality of frequency bands. The frequency bands or channels used for air traffic control communication may change during flight. For example, an aerial vehicle may change communication frequencies as control is handed-off from one air traffic control tower to another air traffic control tower.

Speech processing system 208 additionally includes authentication unit 256, speech recognition unit 258, voiceprint configuration unit 260, voice command system 262, and one or more optional biometric interfaces 254. Biometric interfaces 254 can be in communication with one or more biometric sensors 272 aboard the aerial vehicle 100. Biometric sensors 272 may be configured to receive input biometric information such as a fingerprint, retinal scan, vein pattern, visual facial information, or other personal identifying information from one or more persons, such as a pilot and/or co-pilot of the aerial vehicle. Although not shown, speech processing system 208 may include or be in communication with biometric data storage. The biometric data storage can be used to store signatures such as reference voiceprints, fingerprints, or other reference biometric information for authorized users.

Speech recognition unit 258 is configured to identify words, phrases, or other information from an audio input. In one embodiment, speech recognition unit 258 is configured to operate without utilizing training data. In this manner, speech recognition unit 258 can be configured as a generalized recognition unit operable to detect speech from multiple input sources. In other examples, speech recognition unit 258 may use training data to aid in speech recognition.

Authentication unit 256 is configured to authenticate input voice data in order to determine whether to execute or otherwise cause a system response based on voice commands included in input voice data. Authentication unit 256 may access one or more reference voiceprints, for example, to determine whether to authorize execution of a voice command included in input voice data. The input voice data can be compared to the reference voiceprints. If the input voice data includes a signature or voiceprint that matches the reference voiceprints, a detected voice command can be executed. If, however, input voice data does not match one or more of the reference voiceprints, a detected voice command can be rejected or otherwise ignored. It is noted that authentication unit 256 may include additional inputs in order to determine whether to execute a voice command. For example, authentication unit 256 may compare input biometric information received via the biometric interfaces 254 with reference biometric signatures in addition to the reference voiceprints in order to determine whether to execute a voice command.

Authentication unit 256 may authenticate individual voice commands in some examples. For instance, a particular reference voiceprint may be associated with one or more voice command sets(s) 264 for which it is authorized to cause a system response. Authentication unit 256 may determine whether a detected voice command is in a set of predetermined voice commands for which the reference voiceprint is authorized. In FIG. 3, the voice commands sets 264 are shown as part of voice command system 262. In other examples the voice commands may be included as part of authentication unit 256 or may be stored separately but accessible to both units.

Voiceprint configuration unit 260 is configured to generate and store reference voiceprints for use in authenticating input voice data. Voiceprint configuration unit 260 can determine whether voiceprint configuration is authorized based at least in part on performance data associated with the aerial vehicle. For example, voiceprint configuration unit 260 can determine whether the aerial vehicle 100 is in a secure operational state prior to authorizing reference voiceprint configuration. In this manner, speech processing system 208 can provide a secure method for ensuring authorized voice command use, without requiring previously stored or accessible biometric information for individual users. However, it is noted that voiceprint configuration unit 260 can utilize additional biometric information such as the result of authentication unit 256 in determining whether to authorize voiceprint configuration.

Voice command system 262 is configured to provide an interface between speech processing system 208 and one or more components of aerial vehicle 100. In this example, voice command system 262 is shown interfacing with vehicle control system 214, flight management system 212, and avionics system 210. Voice command system 262 can cause system responses by one or more of the systems in response to detected voice commands from input voice data. For example, speech recognition unit 258 may detect a first voice command in input voice data. Authentication unit 256 may authenticate the input voice data based on the reference voiceprint. This may include authenticating that the reference voiceprint is authorized for the detected voice command Voice command system 262 can determine the appropriate system response based on the input voice command. For instance, voice command system 262 can issue a control signal to appropriate systems such as vehicle control system 214 based on the detected voice command. In one example the control signal may be an input command for the appropriate system. The control signal may cause a system response by the appropriate system of the aerial vehicle.

Voice command system 262 may store one or more voice commands sets 264. A voice command set may identify one or more authorized voice commands Each voice command can be associated with one or more users or groups of users. For example, a voice command set can be associated with a first group of authorized users and a second voice command set can be associated with a second group of authorized users. As will be described in more detail hereinafter, a first command set can be used to authorize locally-generated voice commands and a second command set can identify authorized remotely-generated voice commands Voice command system 262 may compare a detected voice command to one or more voice commands sets to determine whether to authorize a detected voice command. Additionally, voice command sets 264 may store translations of voice commands into appropriate system responses or control signals. Although shown as part of voice command system 262, voice command sets 264 may be stored or be accessible by other units and systems. For example, authentication unit 256 may utilize voice command sets 264 as part of authenticating a voice command or input voice data.

Figure 4:
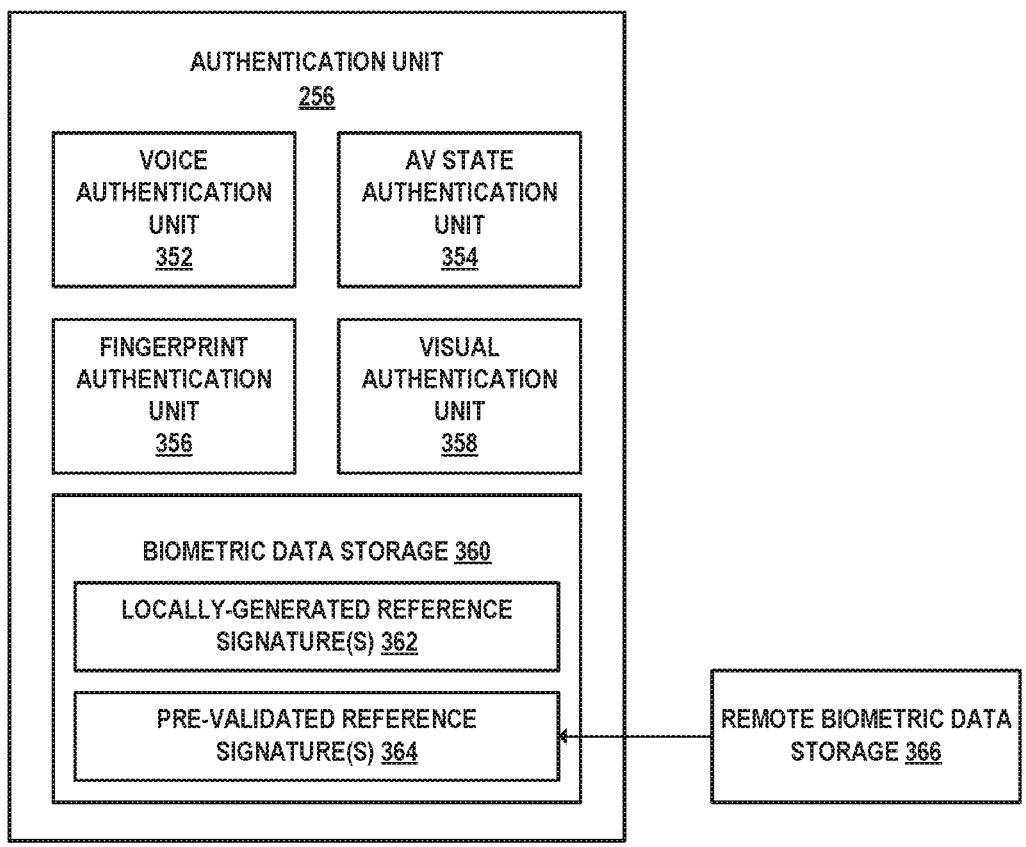
FIG. 4 is a block diagram of an authentication unit of a speech processing system according to example embodiments of the present disclosure.

FIG. 4 is a block diagram depicting additional details of authentication unit 256 in accordance with example embodiments of the disclosed technology. Authentication unit 256 includes an aerial vehicle (AV) state authentication unit 354, voice authentication unit 352, fingerprint authentication unit 356, visual authentication unit 358, and biometric data storage 360.

Authentication unit 256 can perform authentication operations for determining whether reference voiceprint configuration is authorized for the aerial vehicle. Additionally, authentication unit 256 can perform authentication operations for determining whether detected voice commands are authenticated for execution by the speech processing system. During voiceprint configuration operations, authentication unit 256 may be used to determine whether voiceprint configuration is authorized. For example, authentication unit 256 may authenticate various information and/or sources of information to determine whether voiceprint configuration should proceed. In some examples, authentication unit 256 can be used to determine whether voiceprint configuration is authorized without accessing biometric information. In other examples, biometric information can be used as part of authorization for the voiceprint configuration operation. During voice command processing operations, authentication unit 256 may be used to determine whether a detected voice command should be executed.

Biometric data storage 360 may store locally generated reference signatures 362 and/or pre-validated reference signatures 364. Locally generated reference signatures 362 may include reference voiceprints generated by voiceprint configuration unit 260. As such, the storage of locally generated reference signatures 362 may be temporary. Pre-validated reference signatures 364 can include reference signatures (e.g., fingerprint, voiceprints, retina scans, vein signatures, etc.) of authorized users of the speech processing system. Pre-validated reference signatures 364 may be used as part of the authorization process for voiceprint configuration and/or the authentication process for voice command detection. Biometric data storage 360 may include any suitable data store for storing locally generated reference signatures 362 and/or pre-validated reference signatures 364. The biometric data storage 360 may include any suitable data storage technology such as databases, files, data structures and the like configured to store the associated information. In some embodiments, the data store may comprise any combination of one or more of a hard disk drive, RAM (random access memory), ROM (read only memory), flash memory, etc. A data store may store information that is accessed by the speech processing system, and/or data generated by the speech processing system.

Voice authentication unit 352 is configured to authenticate voice data based on one or more reference voiceprints. Voice authentication unit 352 may be used as part of the authorization process for voiceprint configuration operations, as well as during the authentication process for detected voice commands during normal operation. Generally, voice authentication unit 352 can compare voice data with one or more reference voiceprints. If a threshold similarity is detected between the reference voiceprint and the input voice data, voice authentication unit 352 can authenticate the voice data.

During reference voiceprint configuration operations, voice authentication unit 352, may be used to authenticate the source of the voice data based on a pre-validated reference signature 364. As noted elsewhere, this is not required. For example the system may use other techniques that do not require biometric information to determine whether voiceprint configuration is authorized.

During normal operation, voice authentication unit 352 compares input voice data to one or more locally generated reference signatures 362. As noted, the locally generated reference signatures 362 can include temporary reference voiceprints generated during a voiceprint configuration operation. Voice authentication unit 352 may be used to determine whether a detected voice command and input voice data should be executed by the system. Voice authentication unit 352 may generate voiceprints from input voice data to compare to the reference voiceprints in some examples.

AV state authentication unit 354 is configured to authenticate an operational state of the aerial vehicle. In example embodiments, AV state authentication unit 354 authenticates the operational state of the aerial vehicle based at least in part on performance data associated with one or more sensors of the aerial vehicle. By way of example, AV state authentication unit 354 may use position information, speed information, altitude information, external connection information (e.g., whether the aerial vehicle is connected to external systems such as HVAC, power, fueling systems etc.), and any other information determined from performance data to authenticate an operational state of the aerial vehicle.

Fingerprint authentication unit 356 is configured to authenticate input fingerprint information based on one or more reference fingerprints included in pre-validated reference signatures 364. Similarly, visual authentication unit 358 is configured to authenticate input visual information based on one or more reference visual signatures included in pre-validated reference signatures 364. For example, visual authentication unit 358 may perform authentication using facial recognition techniques. As earlier described, fingerprint authentication unit 356 and visual authentication unit 358 are optional.

Figure 5:
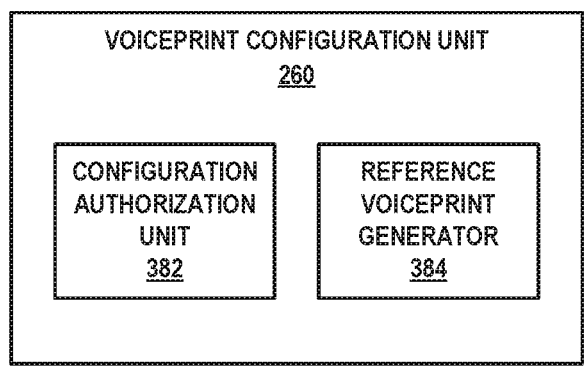
FIG. 5 is a block diagram of a voiceprint configuration unit of the speech processing system according to example embodiments of the present disclosure.

FIG. 5 is a block diagram depicting additional details of voiceprint configuration unit 260 in accordance with example embodiments of the disclosed technology. Voiceprint configuration unit 260 includes configuration authorization unit 382 and reference voiceprint generator 384. Configuration authorization unit 382 is operable to determine whether reference voiceprint configuration is authorized. More particularly in one example, configuration authorization unit 382 can determine whether a plurality of inputs have been received confirming a secure operational state of the aerial vehicle. The plurality of inputs may be used to determine whether the vehicle is in a rollout phase of the flight for example. The rollout phase refers to a flight phase with the aerial vehicle moves between the gate and a runway. During the rollout phase, the aerial vehicle can be considered to be in a secure operational state. AV state authentication unit 354 may determine whether the aerial vehicle is in a rollout phase based on one or more of these inputs. For example, AV state authentication unit 354 may determine whether the aerial vehicle speed, altitude, and location indicate that the aerial vehicle is in the rollout phase at an airport. Configuration authorization unit 382 may additionally use one or more outputs of authentication unit 256 to determine whether configuration of a reference voiceprint is authorized. For example, configuration authorization unit 382 may determine whether the voice data matches one or more pre-validated reference voiceprints and/or whether other biometric input information matches other pre-validated reference signatures.

Reference voiceprint generator 384 is configured to generate one or more reference voiceprints based on voice data. Reference voiceprint generator 384 may generate reference voiceprints from authorized voice data in some examples. The reference voiceprints can be any suitable audio signature operable to uniquely identify a source of audio.

In some examples, authorization for additional voiceprints can be granted in-flight. Secure authentication can be used to add or transfer voice control in-flight between personnel. For example, a handover command may be issued by an already authorized voice, such as by a pilot in the seat speaking a predetermined phrase. Upon interpreting the phrase, the system can enter a configuration mode to allow voice commands from the next voice to be provided from the location of the seat within a configuration time period. In another example, biometrics may be used. For example, when an authorized fingerprint is provided on a particular sensor (e.g., control stick sensor), the voice from the location of the sensor will be authorized.

Figure 6:
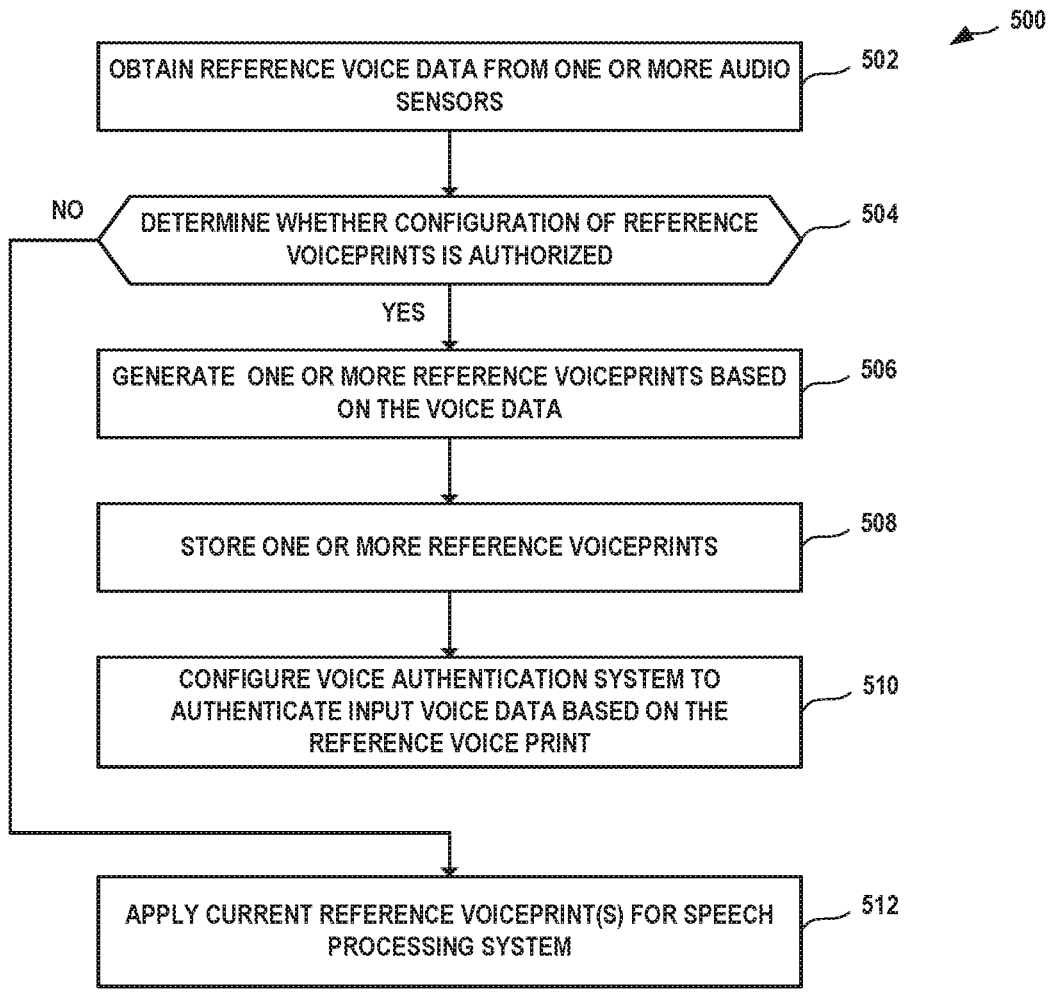
FIG. 6 is a flowchart describing a process of configuring reference voiceprints for a speech processing system of an aerial vehicle according to example embodiments of the present disclosure.

FIG. 6 is flowchart describing an example process 500 of configuring reference voiceprints for a speech processing system of an aerial vehicle in accordance with example embodiments of the disclosed technology. In some implementations, process 500 can be implemented by speech processing system 208 of FIG. 3, for example. FIG. 6 depicts steps performed in a particular order for purposes of illustration and discussion. Those of ordinary skill in the art, using the disclosures provided herein, will understand that various steps of any of the methods or processes disclosed herein can be adapted, modified, rearranged, performed simultaneously or modified in various ways without deviating from the scope of the present disclosure.

At (502), first voice data associated with one or more audio sensors of an aerial vehicle is obtained. The first voice data may be referred to as reference voice data as it will conditionally be used to generate a reference voiceprint. The first voice data can be received from a particular audio sensor within the aerial vehicle, such as a microphone located in the cockpit or other predetermined location of the aerial vehicle. The first voice data may be obtained directly from the one or more audio sensors or may be obtained from a temporary storage location.

At (504), it is determined whether configuration of a reference voiceprint for the speech processing system of the aerial vehicle is authorized. In some examples, determining whether configuration is authorized at (504) is based at least in part on performance data of the aerial vehicle. For example, the system may use the performance data to determine an operational state of the aerial vehicle. The system may determine whether the aerial vehicle in a rollout phase or is otherwise in a secure operational state based on the performance data. Biometric information can also be used to determine whether configuration is authorized. Additionally, the source of the reference voice data can be authenticated to determine whether configuration is authorized. For example the system may only permit reference voiceprint configuration based on audio data received from a predetermined set of sensors aboard the aerial vehicle, such as from a particular microphone or microphone positioned in the cockpit.

If configuration of a reference voiceprint is authorized, one or more reference voiceprints are generated based on the reference voice data at (506). At (508), the one or more reference voiceprints are stored for use by the speech processing system. At (510), the speech processing system is configured to authenticate additional voice data based on the reference voiceprint. The system may enable authentication as well as voice command authorization based on the reference voiceprint.

If configuration of a reference voiceprint is not authorized, as determined at (504), any current reference voiceprints can be applied for the speech processing system at (512).

Figure 7:
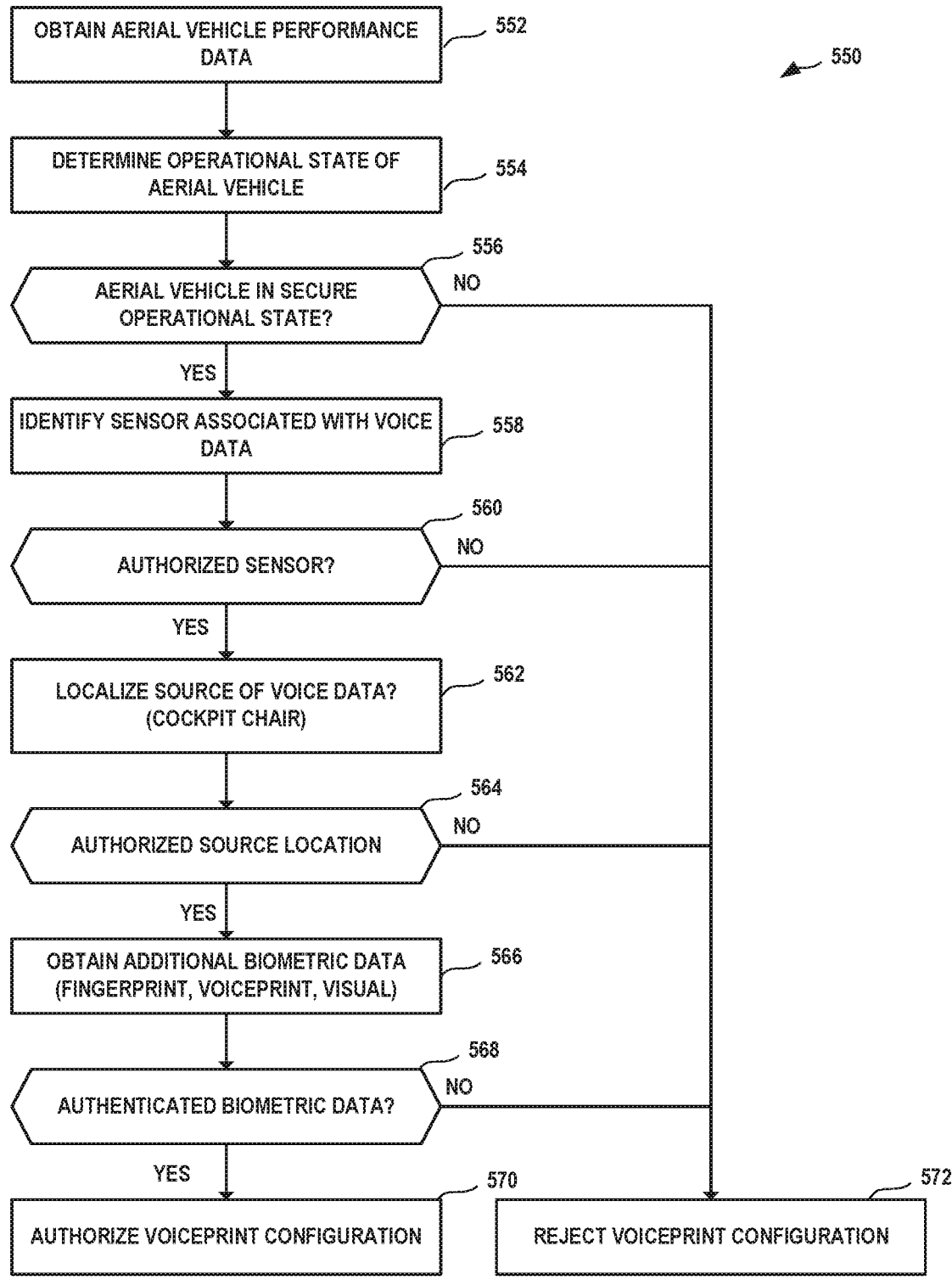
FIG. 7 is a flowchart describing a process of authorizing configuration of reference voiceprints for a speech processing system of an aerial vehicle according to example embodiments of the present disclosure.

FIG. 7 is a flowchart depicting a process 550 for determining whether configuration of a reference voiceprint is authorized for a speech processing system of an aerial vehicle in accordance with example embodiments of the disclosed technology. In some examples, process 550 may be performed at (504) of process 500 depicted in FIG. 6. Process 550 may be performed by a configuration authorization unit 382 of speech processing system 208 in some implementations.

At (552), aerial vehicle performance data is obtained for the aerial vehicle aboard which the speech processing system is to be configured. Various performance data may be obtained at (552). The performance data may include or be derived from sensor data associated with one or more sensors of the aerial vehicle. The sensor data may include or represent one or more measured parameters of the aerial vehicle, such as speed, acceleration, altitude, temperature, or any other parameter associated with the aerial vehicle. Authentication unit 256 may receive the sensor data directly from the one or more sensors, or may receive the sensor data from a memory or other storage location in example embodiments.

At (554), an operational state of the aerial vehicle is determined based at least in part on the performance data. The system may analyze performance data indicating speed, altitude, location, or other performance data to determine an operational state of the aerial vehicle. By way of example, the operational state may correspond to a particular flight phase in some embodiments. The system may determine whether the aerial vehicle is in a pre-departure phase, a rollout phase, a takeoff phase, a climbing phase, a cruising phase, a descent phase, a landing phase, a taxi phase, or an arrival phase, etc.

At (556), it is determined whether the aerial vehicle is in a secure operational state. For example, reference voiceprint configuration may be limited to a particular phase or particular phases of a flight in example embodiments. These one or more flight phases may correspond to secure operational states. At (556), the system may determine if the aerial vehicle is in one or more phases determined to be a secure operational state for reference voiceprint configuration. By way of example, the system may determine whether the aerial vehicle is in a rollout phase corresponding to a position between the gate of an airport and the runway for takeoff. Other flight stages may be determined to correspond to secure operational states in other examples.

If the system determines that the aerial vehicle is not in a secure operational state, process 550 continues at (572). At (572), the system rejects or denies the attempted reference voiceprint configuration.

If the aerial vehicle is determined to be in a secure operational state, process 550 continues at (558). At (558), one or more sensors associated with the input voice data are identified. At (560), the system determines whether the identified sensor(s) are authorized for reference voiceprint configuration. In this manner, the system may limit reference voiceprint configuration to particular audio sensors within the aerial vehicle. For example, the system may limit reference voiceprint configuration to one or more microphones positioned in the cockpit of the aerial vehicle. The microphones may be boom microphones associated with particular cockpit chairs of the aerial vehicle in some examples. In another example, the microphones may be microphones associated with a particular headset of the aerial vehicle. If the system determines that the voice data is not associated with an authorized sensor, process 550 continues at (572).

If the system determines that the voice data is associated with an authorized sensor, process 550 continues at (562). At (562), the source of the voice data is localized within the aerial vehicle. The system may determine a location from where the voice data originates within the aerial vehicle. At (564), it is determined whether the location is an authorized location for reference voiceprint configuration. By way of example, the system may limit reference voiceprint configuration to a particular cockpit chair or cockpit chairs within the cockpit of the aerial vehicle. Other locations may be designated as authorized locations for reference voiceprint configuration in other examples. If the system determines that the location of the voice data origination is not authorized, process 550 continues at (572).

If the system determines that the location is authorized, process 550 continues at (566). At (566), additional biometric data may be obtained to authenticate the source of the voice data. For example, the system may obtain a fingerprint, voiceprint, facial recognition data, or any other self-identifying information to further authenticate the source of the voice data.

At (568), it is determined whether the additional biometric data is authenticated. For example, the system may compare the additional biometric data with reference biometric data stored locally or retrieved from a remote location to authenticate the source the additional biometric data. Blocks (566) and (568) are optional. If the additional biometric data is not authenticated, process 550 continues at (572).

If the additional biometric data is authenticated, process 550 continues at (570). At (570), reference voiceprint configuration is authorized for the speech processing system of the aerial vehicle. The system may proceed with generating a reference voiceprint from the reference voice data received as an input to the speech processing system.

It is noted that the particular authentication operations performed in process 550 are provided by way of example only. Additional authentications may be performed in other embodiments. Similarly fewer authentications may be performed in other embodiments. It is specifically noted that the authentications performed using additional biometric data at (566) and (558) are optional, but may provide additional levels of security.

Figure 8:
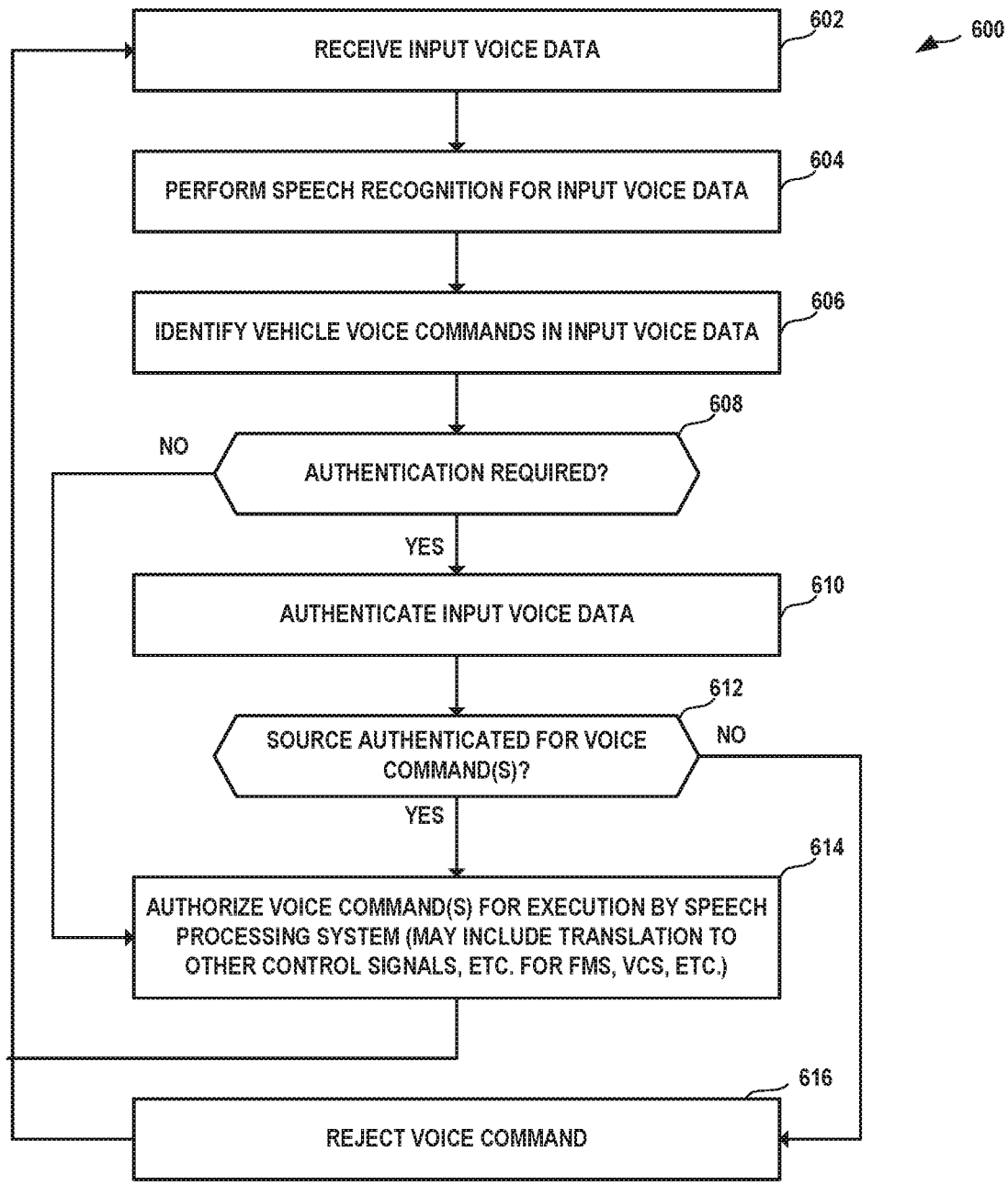
FIG. 8 is a flowchart describing a process of authorizing detected voice commands for a speech processing system of an aerial vehicle according to example embodiments of the present disclosure.

FIG. 8 is a flowchart describing a process 600 for authenticating input voice data associated with one or more voice commands based on a reference voiceprint in accordance with example embodiments of the disclosed technology. Process 600 may be performed by a speech recognition system in some examples. In one embodiment, process 600 is performed by an authentication unit 256.

At (602), input voice data is received from one or more audio sensors aboard the aerial vehicle. For example, the input voice data may be received by one or more microphones positioned in the cockpit of an aerial vehicle to capture voice commands by a pilot or other operator of the aerial vehicle.

At (604), speech recognition is performed for the input voice data. Any suitable speech recognition technique can be used to detect words, phrases, or other meaningful symbols in an audio signal. At (606), the system identifies one or more vehicle voice command from the input voice data. The vehicle voice commands can be predetermined voice commands stored in memory accessible to the authentication unit in one embodiment. The voice commands may be associated with or otherwise control one or more aerial vehicle functions. The functions may be for example and without limitation, engine control functions, navigation functions, flight management functions, and/or any other desired function of the aerial vehicle.

At (608), it is determined whether authentication is required for a detected voice command Determining whether authentication is required may be performed in implementations where it is desired to permit some vehicle voice commands to be performed without authentication and other vehicle voice commands to be performed with authentication. Additionally, (608) may be performed to allow different users access to different voice commands. The determination at (608) is optional. In some examples, authentication can be required for all vehicle voice commands. If authentication is required, process 600 continues at (610). At (610), the input voice data is authenticated. The input voice data can be authenticated using one or more reference voiceprints stored by the authentication unit. If the source of the detected voice command is not authenticated, process 600 continues at (616). At (616), the detected voice command is rejected by the system. After rejecting the detected voice command, process 600 can continue at (602) to receive additional input voice data.

If the source of the detected voice command is authenticated at (612), process 600 continues at (614). At (614), the detected voice command is authorized for execution by the speech processing system. At (614), the system may enable a system response based on the detected voice command. In some examples, the system may issue one or more control signals to another system of the aerial vehicle such as the flight management system, navigation system, vehicle control system, or other system in order to call the system response based on the detected voice command. In some examples the system may maintain a translation database between voice commands and system responses.

Voice commands can be used by the speech processing system to control numerous systems of an aerial vehicle as previously described. Some particular examples of using voice commands may have particular suitability to the unique requirements of aerial vehicles, particularly those used in commercial applications where safety and restricted access is to be provided to portions of the aerial vehicle. By way of example, modern aerial vehicles are typically equipped with a locking cockpit door to restrict access to authorized users. A pin, password, or key may be used to unlock the door and permit authorized personnel to gain entry. While these techniques may be beneficial, improvements may be made. For example, utilizing voice commands and authentication techniques as described herein may provide additional safety and security as well as flexibility for the unique requirements of aerial vehicles in the commercial space.

Figure 9:
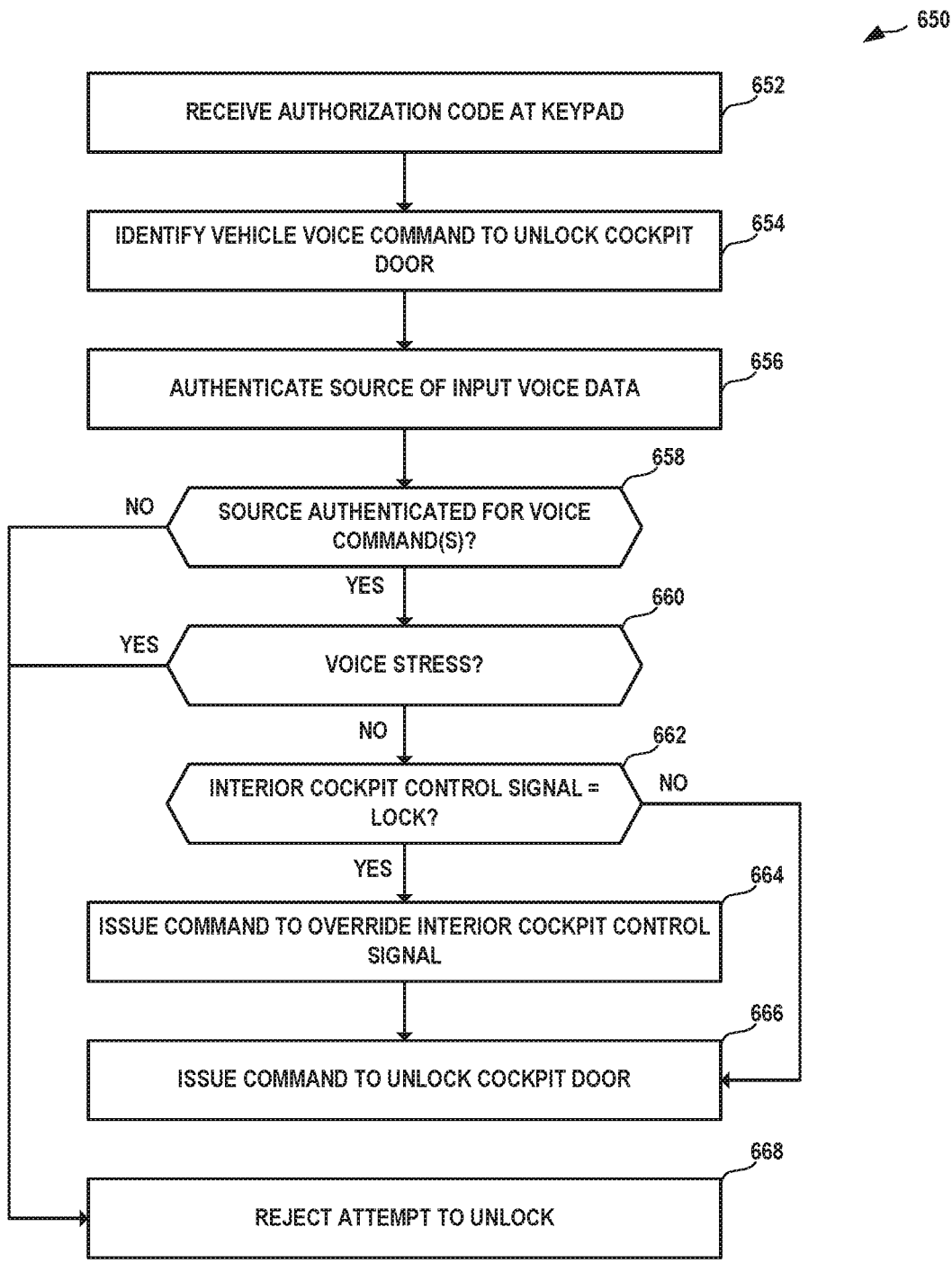
FIG. 9 is a flowchart describing a process of controlling a door lock mechanism of a cockpit door for an aerial vehicle using a speech processing system according to example embodiments of the present disclosure.

FIG. 9 is a flowchart describing a process 650 for controlling an automatic door locking mechanism for a cockpit door of an aerial vehicle in accordance with example embodiments of the disclosed technology. Process 650 may be performed in conjunction with a speech processing system in accordance with example embodiments of the disclosed technology. At (652), an authorization code such as a pin, password, or other secure symbol is received at a keypad or other input mechanism suitable to provide number, text, and/or other input. The keypad is positioned outside of the cockpit of the aerial vehicle in order to allow a user to attempt to gain entry by unlocking the cockpit door into the cockpit. The system does not unlock the cockpit door based solely on the keypad entry, however. Instead the system awaits a voice command to unlock the door for further authentication prior to unlocking the door.

At (654), the system identifies a vehicle voice command to unlock the cockpit door. At (656), the input voice data is authenticated for the unlock command. For example, an authentication unit 256 may determine whether a voice signature of the input voice data matches one or more reference voiceprints stored by the authentication unit. A reference voiceprint may be associated with an individual set of vehicle voice commands for which it is authorized. At (658), it is determined whether the input voice data was authenticated for the unlock voice command. At (658), the system can determine whether the reference voiceprint corresponding to the input voice data is authorized for the particular voice command. If the source is not authenticated for the voice command, the attempt to unlock the door is rejected or ignored. It is noted that the door may not be unlocked even though a proper authorization code was received to unlock the door at (652).

If the source of the input voice data is authenticated for the voice command, it is determined whether the input voice data is associated with a stress condition at (660). The authentication unit may compare a voice signature of the input voice data with one or more reference voiceprints indicating a stressed voice to determine whether the input voice data is associated with a stressed speaker. Other techniques may be used to determine whether the input voice data indicates a stressed condition. The process at (660) can be performed so that entry is denied to speakers who may be in a distressed state. This may aid with avoiding attempted hijackings or other unauthorized entry into the cockpit of the aerial vehicle. For example, an unauthorized user may force an authorized user to speak the voice command to unlock the door. By detecting a stressed condition in the voice, the system may reject the voice command.

If stress is detected in the voice at (660), the attempt to unlock the door is rejected at (668). If stress is not detected in the voice, process 650 continues at (662). At (662), the system determines whether an interior cockpit control signal indicates that the cockpit door should be locked. Many cockpit doors of aerial vehicles have an input within the cockpit that controls a lock for the cockpit door. For example, the input may control an interior control signal. At (662), the system can determine whether the interior control signal indicates that the cockpit door should be locked. If the signal is not asserted that the door should be locked, process 650 continues at (666). At (666), a command is issued to unlock the cockpit door. If the interior cockpit control signal indicates the door should be locked, a first command can be issued at (664) to override the interior cockpit control signal. Other techniques for overriding and input internal to the cockpit may be used. The override at (664) may be useful in situations where an authorized user in the cockpit refuses to open the door. The process at (664) can ensure that other authorized users are allowed entry to the cockpit even if the user within the cockpit denied such entry. After overwriting the interior signal, a command to unlock the cockpit door is issued at (666).

Figure 10:
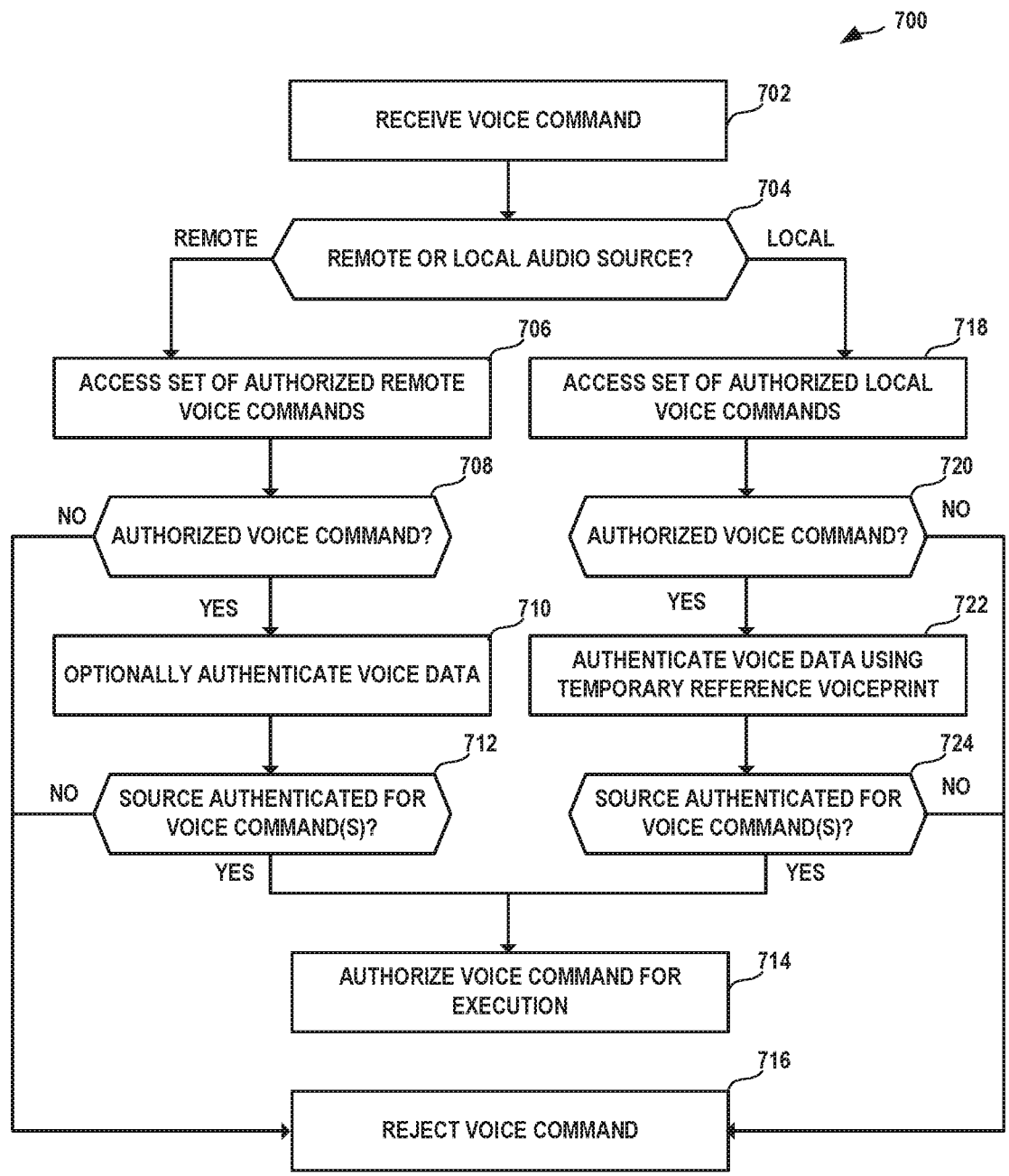
FIG. 10 is a flowchart describing a process of authorizing detected voice commands using multiple sets of reference voice commands.

FIG. 10 is a flowchart describing a process 700 of authorizing voice commands aboard an aerial vehicle using multiple authorized command sets. In this example, a first set of authorized voice commands is utilized for locally generated voice commands and a second set of authorized voice commands is utilized for remotely generated voice commands Locally-generated voice commands are voice commands detected from a local audio device or sensor. For example, locally-generated voice commands may be voice commands received from a cockpit microphone or other microphone aboard the aerial vehicle. Remotely-generated voice commands are voice commands detected from a remote audio device or sensor. For example, remotely-generated voice commands may be voice commands received over a wireless connection through a communications interface with an air traffic control system or other remote system in communication with the aerial vehicle. In some examples, process 700 may be performed by speech processing system 208, and more particularly by authentication unit 256 and/or voice command system 262.

At (702), a voice command is received by the speech processing system. The voice command may be a voice command detected from an input audio source including voice data. In some examples, the voice command may be received at authentication unit 256 from speech recognition unit 258. At (704), the voice commanded is analyzed to determine whether it is from a remote or local audio source. For example, the system may determine whether the voice command is a locally-generated voice command originating from a local audio sensor (270) or a remotely-generated voice command originating from air traffic control system 280.

If the voice command is a remotely generated voice command, process 700 continues at (706). At (706), a set of authorized remote voice commands is accessed. For example, a voice command set 264 including authorized remote voice commands may be accessed. At (708), the received voice command is compared with the set of authorized remote voice commands.

If the received voice command is within the set of authorized remote voice commands, process 700 continues at (710). At (710), the audio data including the remote voice command is authenticated. At (712) the system determines whether the audio data was authenticated for the voice command. It is noted that blocks (710) and (712) are optional. In some examples, authentication is not performed for remotely generated voice commands such as those received over a wireless connection with an air traffic control system. If authentication is used, various techniques can be applied to authenticate audio data of the remote voice command at (710). In one example, authentication of the voice data may be performed as previously described using a reference voiceprint. However, other techniques may be used to authenticate a remotely generated voice command that do not require the use of voiceprints. This may be useful in scenarios where numerous sources of remote voice commands may be used such that practically maintaining an accurate set of voiceprints is problematic. In one example, a signal may be embedded in the audio data of remotely generated voice commands. The authentication unit may determine whether the voice data includes the embedded signal in order to authenticate the remotely generated voice command. The embedded signal may be an audible signal detectable by the speech processing system but not detectable by the human ear in one example. In other examples, different types of embedded signals may be used.

If the audio data for the voice command is authenticated at (712), process 700 continues at (714). At (714), the detected voice command is authorized for execution. In some examples, authentication unit 256 may provide an indication to voice command system 262 of the authorized voice command. Voice command system 262 may generate a system response based on the voice command. In some examples, voice command system 262 may generate a control signal to one or more additional systems of the aerial vehicle based on the detected voice command. If the audio data for the voice command is not authenticated at (712), process 700 continues at (716). At (716), the detected voice command is rejected and is not executed by the speech processing system or another system of the aerial vehicle.

If the voice command is a locally-generated voice command, process 700 continues at (718). At (718), a set of authorized local voice commands is accessed. At (720), the detected voice command is compared with the set of authorized local voice command. If the detected voice command is not within the set of authorized local voice commands, process 700 continues at (716) where the detected voice command is rejected.

If the detected voice command is within the set of authorized local voice commands, process 700 continues at (722). At (722), the voice data including the locally generated voice command is authenticated using a temporary reference voiceprint as previously described. At (724), the system determines whether the voice data was successfully authenticated. If the voice data was successfully authenticated, process 700 continues at (714) where the detected voice command is authorized for execution. If the voice data is not successfully authenticated, process 700 continues at (716) where the detected voice command is rejected.

While process 700 has been described with respect to remotely-generated voice commands and locally generated voice command, alternative or additional command sets may be utilized in accordance with embodiments of the disclosed technology. For example, particular reference voiceprints may be associated with an individual command or command set so that different users of the speech recognition system may be authorized for different sets of voice commands By way of particular example, a reference voiceprint for a pilot may be associated with a first set of voice commands and a reference voiceprint for a crewmember may be associated with the second set of voice commands. The first of voice commands and the second set of voice commands may be different such that at least one voice command and the first set is not present in the second set or at least one voice command in the second set is not present in the first set.

In some examples, control data identifying a source can be used to authenticate remote transmissions at 710. For example, control data identifying a source can be used to authenticate a data transmission received by an aerial vehicle and sent by a transmitting device associated with the source. In such implementations, control data indicative of the source of the data transmission can be embedded or otherwise introduced into the data transmission sent to the aerial vehicle. The control data may include a source identifier that identifies or is otherwise associated with a source of the data transmission. For example, the control data may be included as a header, footer, metadata, or as any other information included within or otherwise associated with the data transmission. The data transmission can also include a payload, or the message or instructions of the data transmission. Upon receiving the data transmission from a transmitting device associated with the source, processing units of a computing system of the aerial vehicle determine whether the source is authorized based at least in part on the source identifier of the data transmission. Then, the computing system can generate a control action based at least in part on whether the source is authorized. In some implementations, for example, generating the control action includes presenting the payload to an aircrew member of the aerial vehicle if the source is authorized. The payload may be presented automatically in some implementations. As another example, if the source is determined not to be authorized, the control action includes discarding or ignoring the data transmission without presenting the payload to the aircrew members.

In some implementations, the control data of the data transmission can include a cryptographic identification of a source identifier associated with the source of the data transmission. In such implementations, determining whether the source is authorized based at least in part on the source identifier of the data transmission can include: decrypting the cryptographic identification to determine the source identifier associated with the source of the data transmission; accessing a database comprising a plurality of source identifiers associated with a plurality of authorized sources; and ascertaining whether the source identifier of the data transmission matches at least one of the plurality source identifiers associated with the plurality of authorized sources.

Various techniques may be used for authenticating a source of a remote data transmission. For example, source identifiers, times, locations and other information associated with a data transmission may be used. More particularly, timestamps, tri-lateralization, triangulation, voice distortion, inaudible components, etc. may be used to authenticate the source of a data transmission.

Figure 11:
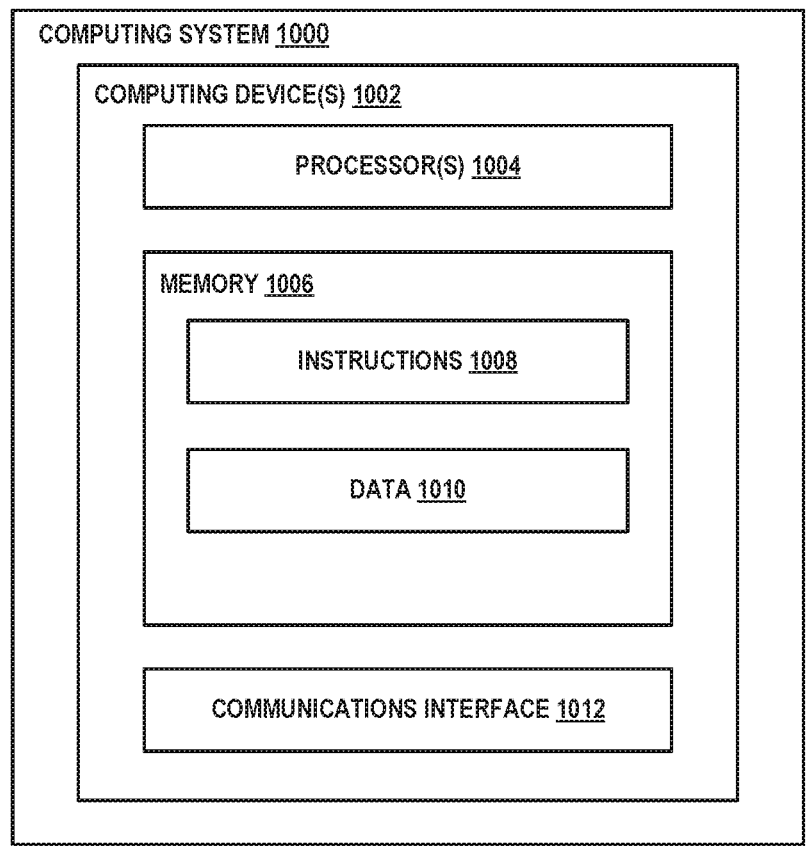
FIG. 11 depicts a block diagram of an example of a computing system in which example aspects of the present disclosure may be implemented.

FIG. 11 depicts a block diagram of an example computing system 1000 that can be used to implement methods and systems according to example embodiments of the present disclosure. Computing system 1000 is one example of an onboard computing device 202, however, any suitable computing system may be used. Computing system 1000 may be used to implement display system 204, communications system 206, speech processing system 208, avionics systems 210, flight management system 212, and/or vehicle control system 214. It will be appreciated, however, that computing system 1000 is one example of a suitable computing system for implementing the computing elements described herein.

As shown, the computing system 1000 can include one or more computing device(s) 1002. The one or more computing device(s) 1002 can include one or more processor(s) 1004 and one or more memory device(s) 1006. The one or more processor(s) 1004 can include any suitable processing device, such as a microprocessor, microcontroller, integrated circuit, logic device, or other suitable processing device. The one or more memory device(s) 1006 can include one or more computer-readable media, including, but not limited to, non-transitory computer-readable media, RAM, ROM, hard drives, flash drives, or other memory devices.

The one or more memory device(s) 1006 can store information accessible by the one or more processor(s) 1004, including computer-readable instructions 1008 that can be executed by the one or more processor(s) 1004. The instructions 1008 can be any set of instructions that when executed by the one or more processor(s) 1004, cause the one or more processor(s) 1004 to perform operations. The instructions 1008 can be software written in any suitable programming language or can be implemented in hardware. In some embodiments, the instructions 1008 can be executed by the one or more processor(s) 1004 to cause the one or more processor(s) 1004 to perform operations, such as the operations for controlling the transmission rate of an ADT device, and/or any other operations or functions of the one or more computing device(s) 1002.

The memory device(s) 1006 can further store data 1010 that can be accessed by the processors 1004. For example, the data 1010 can include sensor data such as engine parameters, model data, logic data, etc., as described herein. The data 1010 can include one or more table(s), function(s), algorithm(s), model(s), equation(s), etc. according to example embodiments of the present disclosure.

The one or more computing device(s) 1002 can also include a communication interface 1012 used to communicate, for example, with the other components of system. The communication interface 1012 can include any suitable components for interfacing with one or more network(s), including for example, transmitters, receivers, ports, controllers, antennas, or other suitable components.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the claimed subject matter, including the best mode, and also to enable any person skilled in the art to practice the claimed subject matter, including making and using any devices or systems and performing any incorporated methods. The patentable scope of the disclosed technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A computer-implemented method, comprising:
   receiving, at a computing system comprising one or more processors positioned in a vehicle, voice data from one or more audio sensors positioned in the vehicle;
   determining, by the computing system, whether configuration of a reference voiceprint for a speech processing system of the vehicle is authorized based at least in part on performance data associated with the vehicle;
   in response to determining that configuration of the reference voiceprint is authorized, storing, by the computing system, a first reference voiceprint based on the voice data; and
   configuring, by the computing system, the speech processing system to authenticate voice data for a first set of voice commands based on the first reference voiceprint.

2. The computer-implemented method of claim 1, wherein the first set of voice commands is associated with one or more controls of the vehicle.

3. The computer-implemented method of claim 1, wherein:
   the speech processing system includes a voice authentication unit; and
   configuring the speech processing system comprises configuring the voice authentication unit to authenticate the voice data for the first set of voice commands.

4. The computer-implemented method of claim 1, wherein determining whether configuration of a reference voiceprint for the speech processing system is authorized comprises determining whether the vehicle is in a secure operational state based at least in part on the performance data.

5. The computer-implemented method of claim 4, wherein determining, by the computing system, whether configuration of a reference voiceprint for a voice authentication unit of the vehicle is authorized comprises determining whether a plurality of inputs have been received confirming the secure operational state of the vehicle.

6. The computer-implemented method of claim 1, wherein:
   the performance data includes location data; and
   determining whether configuration of a reference voiceprint for the speech processing system of the vehicle is authorized comprises determining whether a location of the vehicle corresponds to one or more locations authorized for configuration of a reference voiceprint for the speech processing system.

7. The computer-implemented method of claim 1, wherein:
   the vehicle is an aerial vehicle
   determining whether configuration of a reference voiceprint for the speech processing system of the aerial vehicle is authorized comprises determining whether the aerial vehicle is in a rollout phase of a first flight;
   receiving voice data comprises receiving voice data from the one or more audio sensors for air traffic control communication from the aerial vehicle during the rollout phase;
   the reference voiceprint is a temporary reference voiceprint; and
   configuring the speech processing system comprises configuring the speech processing system to authenticate voice data based on the reference voiceprint during the first flight and configuring the speech processing system to disable authentication of voice data based on the reference voiceprint during at least one subsequent flight.

8. The computer-implemented method of claim 1, wherein determining whether configuration of the reference voiceprint for the speech processing system of the vehicle is authorized comprises:

localizing a source of the reference voice data within the vehicle using the one or more audio sensors; and determining whether the source is associated with one or more authorized locations of the vehicle.

9. The computer-implemented method of claim 1, further comprising: subsequent to configuring the speech processing system based on the first reference voiceprint, configuring the speech processing system in response to a handover command associated with the first reference voiceprint or an additional biometric input.

10. The computer-implemented method of claim 1, wherein determining whether configuration of the reference voiceprint for the speech processing system of the vehicle is authorized comprises:

authenticating the voice data from the one or more audio sensors based on a comparison to biometric data, the authenticating being based on a proximity of a source of the biometric data and a source of the reference voice data.

11. The computer-implemented method of claim 1, further comprising:

receiving, by the computing system, first input voice data; and selectively authorizing, by the computing system, execution of one or more of the voice commands of the set of voice commands by the speech processing system of the vehicle based on comparing the first input voice data with the reference voiceprint.

12. The computer-implemented method of claim 11, further comprising:

receiving, by the computing system, second input voice data via a wireless connection;

identifying one or more voice commands in the second input voice data;

determining whether the one or more voice commands in the second input voice data are included in a set of preauthorized remote voice commands; and authorizing the one or more voice commands for execution by the speech processing system based at least in part on inclusion of the one or more voice commands in the set of preauthorized remote voice commands.

13. The computer-implemented method of claim 1, further comprising:

in response to determining that configuration of the reference voiceprint is authorized, generating, by the computing system, the reference voiceprint based on the reference voice data.

14. The computer-implemented method of claim 1, where the vehicle is an aerial vehicle, the computer-implemented method further comprising:

receiving first voice data including a first voice command associated with unlocking a cockpit door of the aerial vehicle, the first voice data being received from a first sensor external to a cockpit of the aerial vehicle;

authenticating the first voice data based on the reference voiceprint;

determining that an input internal to the cockpit is associated with locking the cockpit door; and overriding the input internal to the cockpit based on the first voice data if the first voice data is authenticated for the first voice command.

15. A system, comprising:
one or more audio sensors positioned in a vehicle and configured to generate voice data; and
one or more processors configured to:
receive voice data from the one or more audio sensors positioned in the vehicle;
determine whether configuration of a reference voiceprint for a speech processing system of the vehicle is authorized based at least in part on performance data associated with the vehicle;
in response to determining that configuration of the reference voiceprint is authorized, store a first reference voiceprint based on the voice data; and
configure the speech processing system to authenticate voice data for a first set of voice commands based on the reference voiceprint.

16. The system of claim 15, wherein determining whether configuration of a reference voiceprint for the speech processing system of the vehicle is authorized comprises:

determining whether a location of the aerial vehicle corresponds to one or more locations authorized for configuration of a reference voiceprint for the speech processing system.

17. The system of claim 15, wherein:
the vehicle is an aerial vehicle;
determining whether configuration of a reference voiceprint for the speech processing system of the aerial vehicle is authorized comprises determining whether the aerial vehicle is in a rollout phase of a first flight;
receiving voice data comprises receiving voice data from the one or more audio sensors in association with air traffic control communication from the aerial vehicle during the rollout phase;
the reference voiceprint is a temporary reference voiceprint; and
configuring the speech processing system comprises configuring the speech processing system to authenticate voice data based on the reference voiceprint during the first flight and configuring the speech processing system to disable authentication of voice data based on the reference voiceprint during at least one subsequent flight.

18. The system of claim 15, wherein determining whether configuration of the reference voiceprint for the speech processing system of the vehicle is authorized comprises:

localizing a source of the voice data within the vehicle using the one or more sensors; and determining whether the source is associated with one or more authorized locations within the vehicle.

19. A computer-implemented method, comprising:
receiving, at a computing system comprising one or more processors positioned in a vehicle, sensor data from one or more sensors positioned in the vehicle;

determine, at the computing system, whether configuration of a reference biometric for a control processing system of the vehicle is authorized based at least in part on performance data associated with the vehicle;

in response to determining that configuration of the reference biometric is authorized, store a first reference biometric based on the reference biometric data; and configure the control processing system to authenticate input for a first set of control commands based on the reference biometric.

* * * * *